United States Patent
Dong et al.

(10) Patent No.: US 10,848,353 B1
(45) Date of Patent: Nov. 24, 2020

(54) MULTI-TAP DECISION FEEDBACK EQUALIZER (DFE) ARCHITECTURE WITH SPLIT-PATH SUMMER CIRCUITS

(71) Applicant: Intel Corporation, Santa Clara, CA (US)

(72) Inventors: Yikui Dong, Cupertino, CA (US); Shenggao Li, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/457,404

(22) Filed: Jun. 28, 2019

(51) Int. Cl.
*H03H 7/30* (2006.01)
*H03H 7/40* (2006.01)
*H03K 5/159* (2006.01)
*H04L 25/03* (2006.01)
*H04L 25/49* (2006.01)

(52) U.S. Cl.
CPC .. *H04L 25/03267* (2013.01); *H04L 25/03025* (2013.01); *H04L 25/4902* (2013.01)

(58) Field of Classification Search
CPC .......... H04L 25/03267; H04L 25/4902; H04L 25/03025; H04L 25/03057
USPC ........................................ 375/232, 233, 234
See application file for complete search history.

(56) References Cited

U.S. PATENT DOCUMENTS

2009/0316770 A1  12/2009  Hidaka
2013/0287089 A1  10/2013  Bulzacchelli et al.
2016/0173300 A1*  6/2016  Laufer .............. H04L 25/03057
    375/233
2017/0078118 A1  3/2017  Chattopadhyay et al.
2017/0264467 A1  9/2017  Neto

FOREIGN PATENT DOCUMENTS

KR  10-2007-0061244 A  6/2007

OTHER PUBLICATIONS

Jay Im et al., "A 40-to-56 Gb/s PAM-4 Receiver With Ten-Tap Direct Decision-Feedback Equalization in 16-nm FinFET," IEEE Journal of Solid-State Circuits, vol. 52, No. 12, Dec. 2017, 17 pages.
International Search Report and Written Opinion dated Jul. 15, 2020 for International Application No. PCT/US2020/023214, 9 pages.

* cited by examiner

*Primary Examiner* — Phuong Phu
(74) *Attorney, Agent, or Firm* — Schwabe, Williamson & Wyatt, P.C.

(57) ABSTRACT

Embodiments include apparatuses, methods, and systems including a decision feedback equalizer (DFE). The DFE includes a first summer circuit, a second summer circuit, a decision circuit, and a tap-delay line including a number of delay elements. The first summer circuit is to add together an analog signal and a first set of weighted feedback taps $\{h(j+1), \ldots h(m)\}$ of time delayed signals of a detected symbol to generate a first summand. The second summer circuit is to add together a second set of weighted feedback taps $\{h(k+1), h(n)\}$ of time delayed signals of the detected symbol to generate a second summand. The decision circuit is to receive at least the first summand and the second summand, to generate the detected symbol based on a sum including the first summand and the second summand. Other embodiments may also be described and claimed.

21 Claims, 9 Drawing Sheets

US 10,848,353 B1

MULTI-TAP DECISION FEEDBACK EQUALIZER (DFE) ARCHITECTURE WITH SPLIT-PATH SUMMER CIRCUITS

FIELD

Embodiments of the present disclosure generally relate to the field of communication and computing circuits, and more particularly, to decision feedback equalizer (DFE).

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Digital communication is used in interconnected networks and systems such as servers and data communication routers. However, a signal received by a receiver of a digital communication system may suffer from inter-symbol interference (ISI). A decision-feedback equalizer (DFE) may be used in the receiver to equalize a channel, and to cancel the effect of the past bits on a current bit to reduce ISI. However, existing DFE architectures may suffer from many problems. For example, massive tap wiring in some current multi-tap DFE architecture may lead to routing congestion and large resistor-capacitor (RC) loading to slow down the DFE feedback timing.

BRIEF DESCRIPTION OF THE DRAWINGS

Embodiments of the present disclosure may overcome some limitations for current technology. The techniques will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1A:
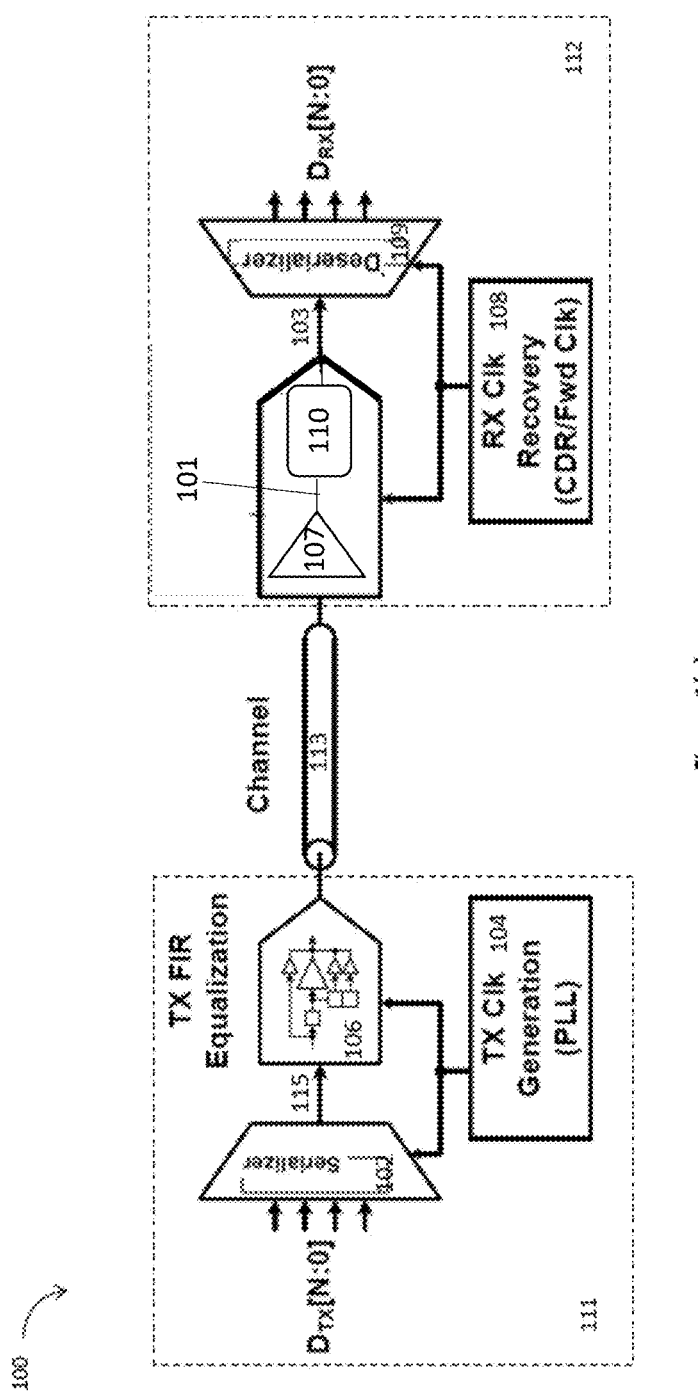
FIGS. 1(a)-1(b) schematically illustrate a communication system having a transmitter and a receiver including a decision-feedback equalizer (DFE), according to various embodiments.

A decision-feedback equalizer (DFE) may be used in a receiver of a communication system to equalize a channel, and to cancel the effect of the past bits on a current bit to reduce inter-symbol interference (ISI). However, existing DFE architectures may suffer from many problems. For example, some DFE may use two cascaded analog summers or summer circuits, which may use a large number of inductors, and massive tap wirings leading to large area, long delay, and high power consumption. A summer may be referred to as a summer circuit.

Embodiments herein present an efficient multi-tap DFE architecture with split path summer circuits, which include two summer circuits placed on a split path, to generate a detected symbol. The detected symbol represents a digital value. A first summer circuit is to add together an analog signal and a first set of weighted feedback taps $\{h(j+1), \ldots, h(m)\}$ of time delayed signals of the detected symbol to generate a first summand. A second summer circuit is to add together a second set of weighted feedback-taps $\{h(k+1), \ldots, h(n)\}$ of time delayed signals of the detected symbol to generate a second summand. The first summer circuit may be referred to as an analog summer, while the second summer circuit may be referred to as a minor-tap summer. A decision circuit is positioned to receive the first summand and the second summand, to generate the detected symbol based on a sum including the first summand and the second summand. The first summer circuit and the second summer circuit may be referred to as split-path summers, since the first summer circuit is on a critical path from the analog signal to the detected symbol, while the second summer circuit is not on the critical path. Accordingly, the first summer circuit and the second summer circuit may be viewed as positioned in parallel, instead of sequentially positioned on the critical path of the detected symbol.

Hence, the detected symbol is generated by the decision circuit based on the first summand and the second summand. The first summer circuit is to generate the first summand based on the analog signal, which may be an incoming signal from a channel, or from other signal preconditioning circuit such as a continuous equalizer, and the first set of weighted feedback taps $\{h(j+1), \ldots h(m)\}$ of the time delayed signals of a detected symbol, which are time delayed versions of the detected symbol. The second summer generates the second summand of the weighted feedback-taps $\{h(k+1), \ldots h(n)\}$ in parallel and provides the second summand to the decision circuit. In some embodiments, the first summer circuit may add together an analog signal and the $1^{st}$ and the $2^{nd}$ major feedback taps of the time delayed signals of the detected symbol, and the second summer circuit adds together the rest of the feedback taps, e.g., $\{h(3), \ldots, h(n)\}$ of the time delayed signals of the detected symbol. The analog signal to the DFE of embodiments herein may be in a non-return-to-zero (NRZ) format, a pulse amplitude modulation (PAM) 4 format, or a PAM N format.

In various embodiments, a DFE includes a first summer circuit, a second summer circuit, a decision circuit, and a tap-delay line including a number of delay elements. The first summer circuit is to add together an analog signal and a first set of weighted feedback taps $\{h(j+1), \ldots h(m)\}$ of time delayed signals of a detected symbol to generate a first summand. The detected symbol represents a digital value. The second summer circuit is to add together a second set of weighted feedback taps $\{h(k+1), \ldots h(n)\}$ of time delayed signals of the detected symbol to generate a second summand. The decision circuit is to receive at least the first summand and the second summand, to generate the detected symbol based on a sum including the first summand and the second summand. The tap-delay line includes a number of delay elements to receive the detected symbol, and to generate the first set of the time delayed signals of the detected symbol and the second set of the time delayed signals of the detected symbol.

In various embodiments, a method for DFE includes generating, by a tap-delay line including a number of delay elements, a first set of time delayed signals of a detected symbol and a second set of time delayed signals of the detected symbol. The method further includes generating a first summand, by a first summer circuit, by adding together an analog signal and a first set of weighted feedback taps $\{h(j+1), \ldots h(m)\}$ of the first set of time delayed signals of the detected symbol. In addition, the method includes generating a second summand, by a second summer circuit, by adding together a second set of weighted feedback taps $\{h(k+1), \ldots h(n)\}$ of the second set of time delayed signals of the detected symbol. Moreover, the method includes generating the detected symbol based on a sum including the first summand and the second summand.

In various embodiments, a receiver of a communication system includes a DFE. In detail, the DFE includes a first summer circuit, a second summer circuit, a decision circuit, and a tap-delay line including a number of delay elements. The first summer circuit is to add together an analog signal and a first set of weighted feedback taps $\{h(j+1), \ldots h(m)\}$ of time delayed signals of a detected symbol to generate a first summand. The detected symbol represents a digital value. The second summer circuit is to add together a second set of weighted feedback taps $\{h(k+1), \ldots h(n)\}$ of time delayed signals of the detected symbol to generate a second summand. The decision circuit is to receive at least the first summand and the second summand, to generate the detected symbol based on a sum including the first summand and the second summand. The tap-delay line includes a number of delay elements to receive the detected symbol, and to generate the first set of the time delayed signals of the detected symbol and the second set of the time delayed signals of the detected symbol.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

Figure 1B:
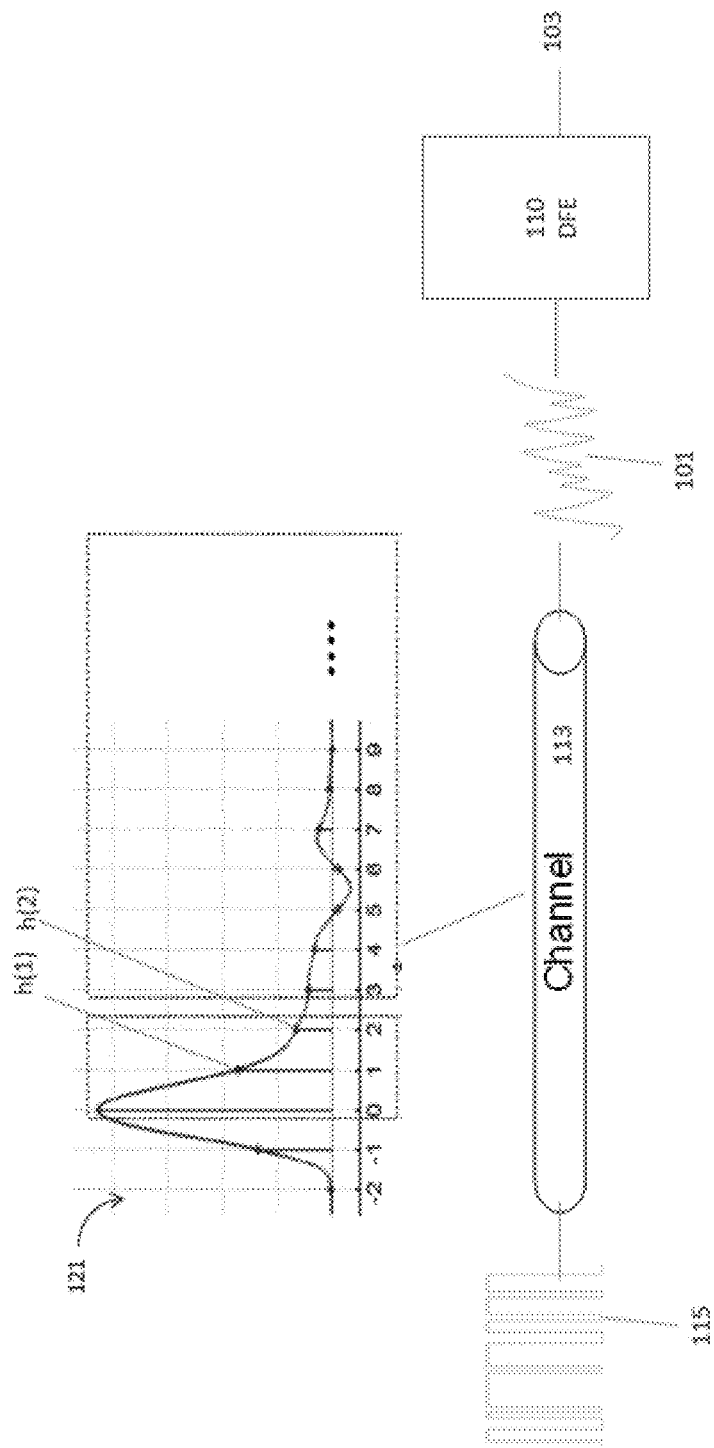

FIGS. 1(a)-1(b) schematically illustrate a communication system 100 having a transmitter 111 and a receiver 112 including a DFE 110, according to various embodiments. The communication system 100 may be referred to as a serdes transceiver since it includes a serializer 102 and a deserializer 109. High-speed serdes transceivers such as the communication system 100 can be widely used in digital communication systems. A DFE, e.g., the DFE 110, is an important functional block for a high performance serdes transceiver. The DFE 110 may additionally or alternatively be used in other types of receive circuits to process a received data signal.

In embodiments, the communication system 100 includes the transmitter 111 and the receiver 112 coupled by a channel 113. In details, the transmitter 111 may include the serializer 102 to receive multiple digital bits in parallel. The transmitter 111 may also include an equalization circuit 106, which may be a finite impulse response (FIR) filter, coupled to the serializer 102, and a clock generation circuit 104, which may be implemented by a phase locked loop (PLL) circuit. The serializer 102 generates an output 115 to be an input for the equalization circuit 106. The output 115 may represents a digital value, e.g., 0 or 1.

In embodiments, the receiver 112 may include a receiver continuous time linear equalizer (CTLE) 107, the DFE 110, a receiver clock recovery circuit 108, and the deserializer 109 to generate parallel multiple bits. The receiver clock recovery circuit 108 may perform clock and data recovery (CDR) function. Additional circuits may be implemented in the transmitter 111 or the receiver 112. For example, according to example embodiments, a signal adaptation circuit with pattern filtering may be implemented within the receiver 112 to adapt the taps for the CTLE 107 and the DFE 110.

In embodiments, the DFE 110 receives an analog signal 101 and generates an output signal 103. The analog signal 101 may be an output of the CTLE 107. As shown in more details in FIG. 1(b), the analog signal 101 may have values varying continuously, instead of a finite set of discrete values. The output 115 of the serializer 102 goes through the equalization circuit 106, through the channel 113, and is fed into the CTLE 107 to generate the analog signal 101 as an output of the CTLE 107. The channel 113, or together with the equalization circuit 106, and the CTLE 107, may impact a digital signal by ISI or other noises. The impact of the channel 113 together with the equalization circuit 106, and the CTLE 107 may be represented by a set of taps 121, which includes {h(1), h(2), . . . h(n)}.

In embodiments, the analog signal 101 may be represented by one or two input voltage signals or current signals. The analog signal 101 may be in a non-return-to-zero (NRZ) format, pulse amplitude modulation (PAM) 4 format, a PAM N format, or another suitable format. The output signal 103 represents a digital value, which may be a one-bit binary digital value, a two-bit digital value, or a N-bit digital value.

In embodiments, the DFE 110 includes two summer circuits placed on a split path. A first summer circuit is placed on a critical path from the analog signal 101 to a detected symbol or to the output signal 103, while a second summer circuit is not on the critical path. Accordingly, the first summer circuit and the second summer circuit may be viewed as positioned in parallel, instead of sequentially positioned on the critical path of the detected symbol. More details of example implementations of the DFE 110 are shown in FIGS. 2(a)-2(b), and FIGS. 3-7.

The communication system 100 may be a next generation transceiver targeting Ethernet, Common Electrical I/O (CEI), e.g., OIF-CEI-56G, Peripheral Component Interconnect Express (PCI Express), and/or another suitable communication protocol. The communication system 100 may have many advantages, e.g., close DFE timing at high speed, easy PAM4/NRZ DFE swapping with register setting, smaller area, and/or lower power consumption. The communication system 100 or the DFE 110 may implement multiple DFE taps, for example, 2 DFE taps, or larger than 10 DFE taps, and may achieve high speed, e.g., 64 Gbps for the analog signal in PAM4 format, or 32 Gbps for the analog signal in NRZ format.

Figure 2:
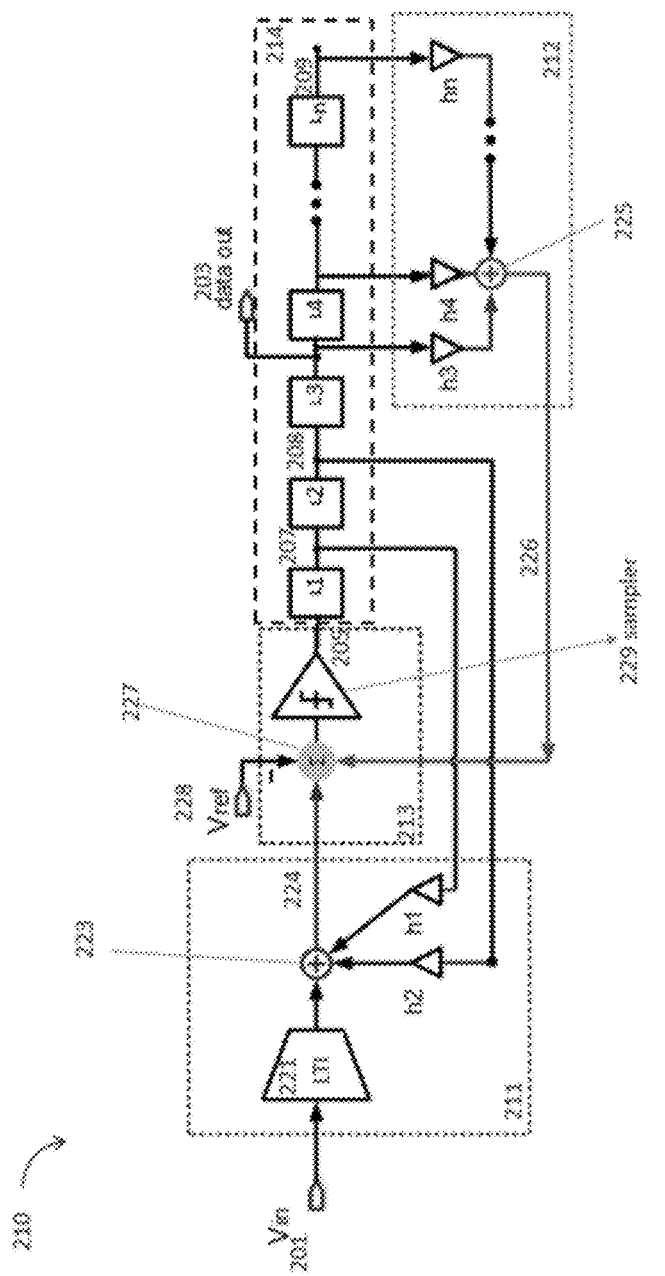
FIG. 2 schematically illustrates a block diagram of a DFE including a first summer circuit with an analog signal as an input, a second summer circuit, and a decision circuit, according to various embodiments.

FIG. 2 schematically illustrates a block diagram of a DFE 210 including a first summer circuit 211 with an analog signal 201 as an input, a second summer circuit 212, and a decision circuit 213, according to various embodiments. In embodiments, the DFE 210 and the analog signal 201 may be an example of the DFE 110 and the analog signal 101 in FIG. 1, respectively.

In embodiments, the DFE 210 includes the first summer circuit 211 with the analog signal 201 as an input, the second summer circuit 212, and the decision circuit 213. The first summer circuit 211 may be referred to as an analog summer since it receives the analog signal 201 as an input. The second summer circuit 212 may be referred to as a minor tap summer. In addition, the DFE 210 includes a tap-delay line 214 including a number of delay elements, e.g., L1, L2, L3, L4, . . . , Ln. Each delay element may include a shift register and/or other suitable circuitry. In some embodiments, there may be more than 2 or more delay elements, e.g., Ln>2, Ln>10, or Ln>18.

In embodiments, the DFE 210 receives the analog signal 201. The analog signal 201 may be represented by one or two input voltage signals or current signals. The analog signal 201 may be in a non-return-to-zero (NRZ) format, pulse amplitude modulation (PAM) 4 format, a PAM N format, or another suitable format.

In embodiments, the decision circuit 213 generates a detected symbol 205, which represents a digital value. Different from an analog signal, a symbol or a digital signal has only a finite set of discrete values, e.g., 0 or 1 for a one-bit digital value. The digital value may be a one-bit binary digital value, a two-bit digital value, or an N-bit digital value. In addition, the DFE 210 is further to generate an output signal 203 that is a time delayed signal of the detected symbol 205. The output signal 203 may be an example of the output signal 103 of FIG. 1. As shown in FIG. 2, the output signal 203 is an output of the delay element L3. In other embodiments, the output signal 203 may be an output of any other delay elements L1, . . . , Ln.

The detected symbol 205 is fed into the tap-delay line 214. The tap-delay line 214 generates a sequence of time delayed signals of the detected symbol 205. For example, a signal 207 of the delay element L1 is a time delayed signal of the detected symbol 205, which is time delayed by one time instance, L1. In some embodiments, one time instance may be referred to as a unit interval (UI), which will be used interchangeably with a time instance. A signal 208 of the delay element L2 is a time delayed signal of the detected symbol 205, which is time delayed by two time instances caused by the delay elements L1 and L2. The signal 203 of the delay element L3 is a time delayed signal of the detected symbol 205, which is time delayed by 3 time instances caused by the delay elements L1, L2, and L3. Furthermore, a signal 209 of the delay element Ln is a time delayed signal of the detected symbol 205, which is time delayed by n time instances caused by the delay elements L1, L2, L3, . . . and Ln.

In embodiments, the sequence of time delayed signals of the detected symbol 205, e.g., the signal 207, the signal 208, the signal 203, . . . the signal 209, is split into two sets, a first set {L(j+1), . . . L(m)} of time delayed signals of the detected symbol 205 and a second set {L(k+1), L(n)} of time delayed signals of the detected symbol 205, where the union of the two sets {L(j+1), . . . L(m)} and {L(k+1), . . . L(n)} is the complete set of delay elements {L1, . . . Ln}. The indices in the first set {L(j+1), . . . L(m)} of time delayed signals and the second set {L(k+1), . . . L(n)} of time delayed signals are for examples only, and the two sets may be any finite subset of the complete set of delay elements {L1, . . . Ln}.

In embodiments, the sequence of time delayed signals of the detected symbol 205, e.g., the signal 207, the signal 208, the signal 203, . . . the signal 209, are fed into a set of weighted feedback taps {h(1), . . . h(n)}, where a tap h(i) corresponds to a delay element Li. For example, a weighted feedback tap h(1) corresponds to the delay element L1. The output of the symbol h1 is a weighted feedback tap h(1) of a time delayed signal of the detected symbol 205. Similarly, the weighted feedback taps {h(1), . . . h(n)} of time delayed signals of the detected symbol 205 are also split into two sets, {h(j+1), . . . h(m)} and {h(k+1), . . . h(n)}.

In embodiments, the first set of weighted feedback taps {h(j+1), . . . h(m)} or the second set of weighted feedback taps {h(k+1), . . . h(n)} may include a set of consecutive weighted feedback-taps, such as {h(1), h(2), . . . h(s)}. For example, the first set of weighted feedback taps includes {h(1), h(2)}, and the second set of weighted feedback taps includes {h(3), . . . h(n)}. As another example, the first set of weighted feedback taps {h(j+1), . . . h(m)} of the time delayed signals of the detected symbol 205 may include {h(1), h(2), . . . , h(k)}, which are generated based on the detected symbol 205 time delayed by at most k time instances. On the other hand, the second set of weighted feedback taps {h(k+1), . . . h(n)} of the time delayed signals of the detected symbol 205 may include {h(k+1), h(k+2), . . . , h(n)}, which are generated based on the detected symbol 205 time delayed by at least (k+1) time instances. In some embodiments, the first set of weighted feedback taps {h(j+1), . . . h(m)} and the second set of weighted feedback-taps {h(k+1), h(n)} may share at least one common tap. In some other embodiments, the first set of weighted feedback taps {h(j+1), . . . h(m)} and the second set of weighted feedback-taps {h(k+1), . . . h(n)} may not share any common tap, and may not have any consecutive weighted feedback-taps.

In embodiments, the first summer circuit 211 is to add together the analog signal 201 and the first set of weighted feedback taps {h(j+1), . . . h(m)} of time delayed signals of the detected symbol 205 to generate a first summand 224. The second summer circuit 212 is to add together the second set of weighted feedback taps {h(k+1), . . . h(n)} of time delayed signals of the detected symbol 205 to generate a second summand 226. The decision circuit 213 is to receive at least the first summand 224 and the second summand 226, and to generate the detected symbol 205 based on a sum including the first summand 224 and the second summand 226. In embodiments, the decision circuit 213 may also receive a reference voltage 228 for generating the detected symbol 205.

In embodiments, the first summer circuit 211 includes at least a linear time-invariant (LTI) circuit 221 and an adder 223, which may be a voltage, current, or charge adder. The LTI circuit 221 may include a transconductance-resistance (GmR) circuit, where the GmR circuit includes a transconductance, and an impedance, to couple the analog signal 201 to the first summand 224. In some embodiments, the LTI circuit 221 may convert the analog signal 201 from a voltage form to a current form. The adder 223 may add together a voltage, current, or charge of the analog signal 201 and a voltage, current, or charge of the first set of weighted feedback taps {h(j+1), . . . h(m)} of the time delayed signals of the detected symbol 205 to generate the first summand 224. In addition, the first summer circuit 211 may include other circuits, e.g., a circuit to buffer the analog signal, a circuit to gain adjust the analog signal, or a circuit to apply frequency peaking of the analog signal.

In embodiments, the second summer circuit 212 includes an adder 225, which may be a voltage, current, or charge adder, to add together the second set of weighted feedback taps {h(k+1), . . . h(n)} of the time delayed signals of the detected symbol 205 to generate the second summand 226. The adder 225 in the second summer circuit 212 and the adder 223 in the summer circuit 211 operate in parallel to generate the first summand 224 and the second summand 226. Hence, the critical path for the detected symbol 205 or the output signal 203 is reduced, and does not include the second summer circuit 212. The adder 225 and the adder 223 may include a collection of multiple adders organized in pipelined or parallel fashion to perform the additions of multiple signals.

Figure 3:
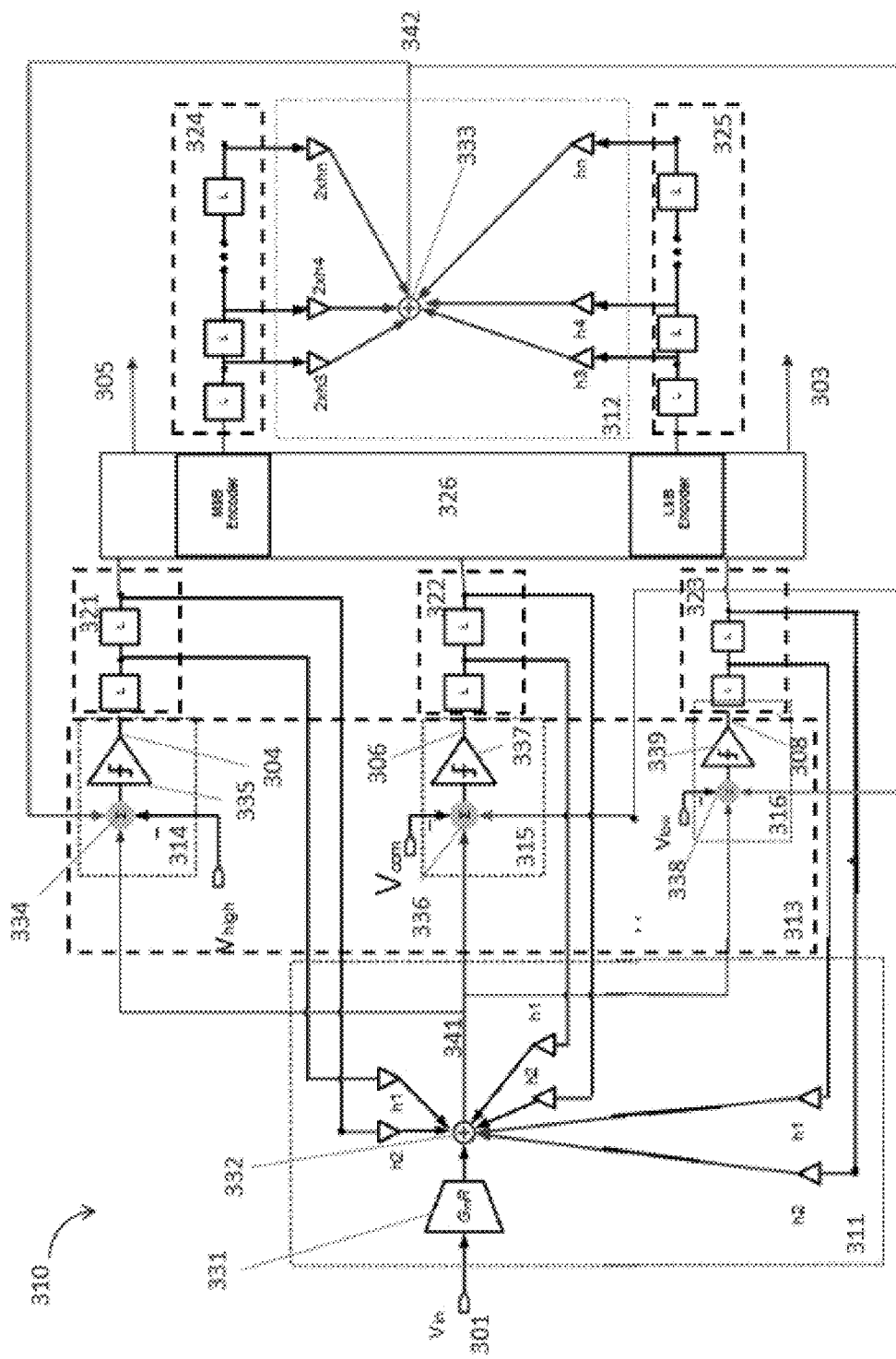
FIG. 3 schematically illustrates a block diagram of a DFE including two different summer circuits and a decision circuit, according to various embodiments.

In embodiments, the decision circuit 213 may include an adder 227 and a sampler 229. The adder 227 may be a voltage, current, or charge adder to add together voltages, currents, or charges representing the first summand 224 and the second summand 226. The decision circuit 213 may further receive the reference voltage signal 228, and to generate the detected symbol 205 based on the reference voltage signal 228 and a sum of the first summand 224 and the second summand 226. In some embodiments, as shown in FIG. 3, the decision circuit 213 may include multiple voltage, current, or charge adders and multiple samplers to generate the detected symbol including multiple bits of the digital value. In such a case, the DFE 210 may further include a decoder to generate an output signal including multiple bits, based on the time delayed signals of the detected symbol, as described in FIG. 3.

FIG. 3 schematically illustrates a block diagram of a DFE 310 including two different summer circuits and a decision circuit, according to various embodiments. In detail, the DFE 310 includes a first summer circuit 311 with an analog signal 301 as an input, a second summer circuit 312, and a decision circuit 313 to generate a detected symbol including a first bit 304, a second bit 306, and a third bit 308. In addition, the DFE 310 also generates an output signal including a first bit 303 and a second bit 305. The first bit 303 may be a least significant bit and the second bit 305 may be a most significant bit of the output signal. In embodiments, the DFE 310 and the analog signal 301 may be an example of the DFE 110 and the analog signal 101 in FIG. 1, respectively.

In embodiments, the DFE 310 includes the first summer circuit 311 with the analog signal 301 as an input, the second summer circuit 312, and the decision circuit 313. The first summer circuit 311 may be referred to as an analog summer since it receives the analog signal 301 as an input. The second summer circuit 312 may be referred to as a minor tap summer.

In addition, the DFE 310 includes multiple tap-delay lines, e.g., a tap-delay line 321, a tap-delay line 322, a tap-delay line 323, a tap-delay line 324, and a tap-delay line 325. The multiple tap-delay lines are separated by a decoder 326 to generate the output signal including the first bit 303 and the second bit 305, based on the time delayed signals of the detected symbol including the first bit 304, the second bit 306, and the third bit 308. The decoder 326 is coupled to the tap-delay line 321, the tap-delay line 322, the tap-delay line 323, the tap-delay line 324, and the tap-delay line 325. The multiple bits, e.g., the first bit 304, the second bit 306, and the third bit 308 of the detected symbol are fed into the multiple tap-delay lines, e.g., the tap-delay line 321, the tap-delay line 322, the tap-delay line 323, the tap-delay line 324, and the tap-delay line 325, to generate a sequence of time delayed signals of the detected symbol.

In embodiments, the first summer circuit 311 is to add together the analog signal 301 and the first set of weighted feedback taps {h(1), h(2)} of time delayed signals of the detected symbol including the first bit 304, the second bit 306, and the third bit 308, to generate a first summand 341. The second summer circuit 312 is to add together the second set of weighted feedback taps {h(3), . . . h(n)} of time delayed signals of the output signal including the first bit 303 and the second bit 305, to generate a second summand 342. The decision circuit 313 includes multiple decision circuits, e.g., a decision circuit 314, a decision circuit 315, and a decision circuit 316, each receiving the first summand 341, the second summand 342, and a reference voltage, to generate the detected symbol including the first bit 304, the second bit 306, and the third bit 308.

In embodiments, the first summer circuit 311 includes at least a LTI circuit 331 and an adder 332, which may be a voltage, current, or charge adder. The LTI circuit 331 may include a transconductance-resistance (GmR) circuit, where the GmR circuit includes a transconductance, and an impedance, to couple the analog signal 301 to the first summand 341. The adder 332 may add together a voltage, current, or charge of the analog signal 301 and a voltage, current, or charge of the first set of weighted feedback taps of {h(1), h(2)} the time delayed signals of the detected symbol including the first bit 304, the second bit 306, and the third bit 308, to generate the first summand 341.

In embodiments, the second summer circuit 312 includes an adder 333, which may be a voltage, current, or charge adder, to add together the second set of weighted feedback taps {h(3), . . . h(n)} of the time delayed signals of the output signal including the first bit 303 and the second bit 305, to generate the second summand 342. The adder 333 in the second summer circuit 312 and the adder 332 in the first summer circuit 311 operate in parallel to generate the first summand 341 and the second summand 342.

In embodiments, the decision circuit 313 includes multiple decision circuits, e.g., the decision circuit 314, the decision circuit 315, and the decision circuit 316. The decision circuit 314 receives the first summand 341, the second summand 342, and a reference voltage Vhigh, to generate the first bit 304 of the detected symbol. The decision circuit 314 includes an adder 334 and a sampler 335. The adder 334 may be a voltage, current, or charge adder to add together voltages, currents, or charges representing the first summand 341 and the second summand 342, together with the reference voltage Vhigh. The decision circuit 315 receives the first summand 341, the second summand 342, and a reference voltage VCom, to generate the second bit 306 of the detected symbol. The decision circuit 315 includes an adder 336 and a sampler 337. The adder 336 may be a voltage, current, or charge adder to add together voltages, currents, or charges representing the first summand 341 and the second summand 342, together with the reference voltage VCom. The decision circuit 316 receives the first summand 341, the second summand 342, and a reference voltage Vlow, to generate the third bit 308 of the detected symbol. The decision circuit 316 includes an adder 338 and a sampler 339. The adder 338 may be a voltage, current, or charge adder to add together voltages, currents, or charges representing the first summand 341 and the second summand 342, together with the reference voltage Vlow.

Figure 4:
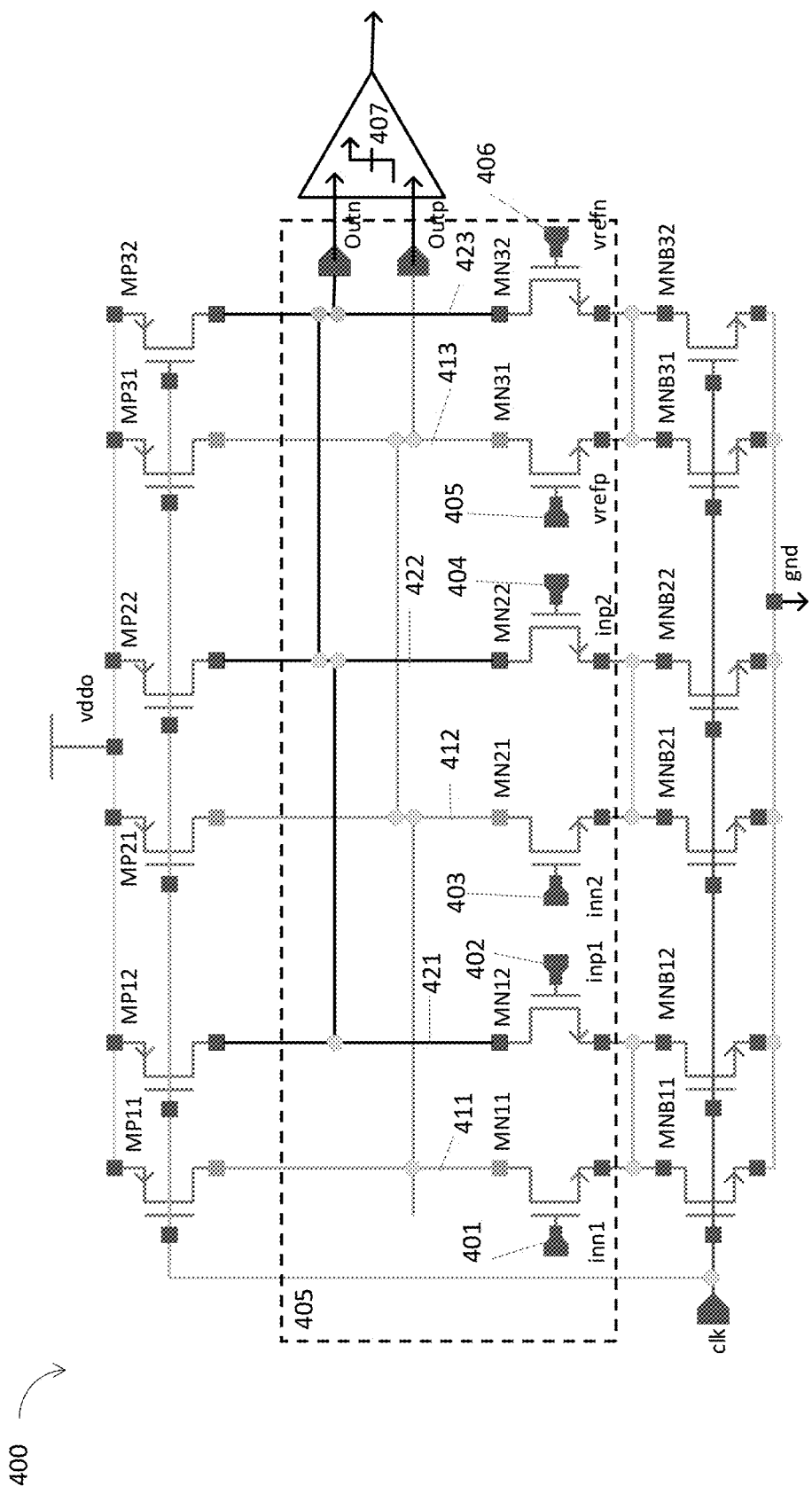
FIG. 4 schematically illustrates a block diagram of a decision circuit used in a DFE, according to various embodiments.

FIG. 4 schematically illustrates a block diagram of a decision circuit 400 used in a DFE, according to various embodiments. In embodiments, the decision circuit 400 may be an example of the decision circuit 213 used in the DFE 210, or the decision circuit 314, the decision circuit 315, and the decision circuit 316 used in the DFE 310.

In embodiments, the decision circuit 400 may include an adder 405 and a sampler 407. The adder 405 is a current adder to add together currents representing a first summand, a second summand, and a reference voltage. In detail, the first summand is represented by two voltages, a voltage signal 401 and a voltage signal 402, the second summand is represented by two voltages, a voltage signal 403 and a voltage signal 404, and the reference voltage also has two voltage signals, a voltage 405 and a voltage 406. Corresponding to a first voltage line for each signal, a current 411 represents the first summand, a current 412 represents the second summand, and a current 413 represents the reference voltage. They are all added together as inputs to the sampler 407. Similarly, corresponding to a second voltage line for each signal, a current 421 represents the first summand, a current 422 represents the second summand, and a current 423 represents the reference voltage. They are also all added together as inputs to the sampler 407.

Figure 5:
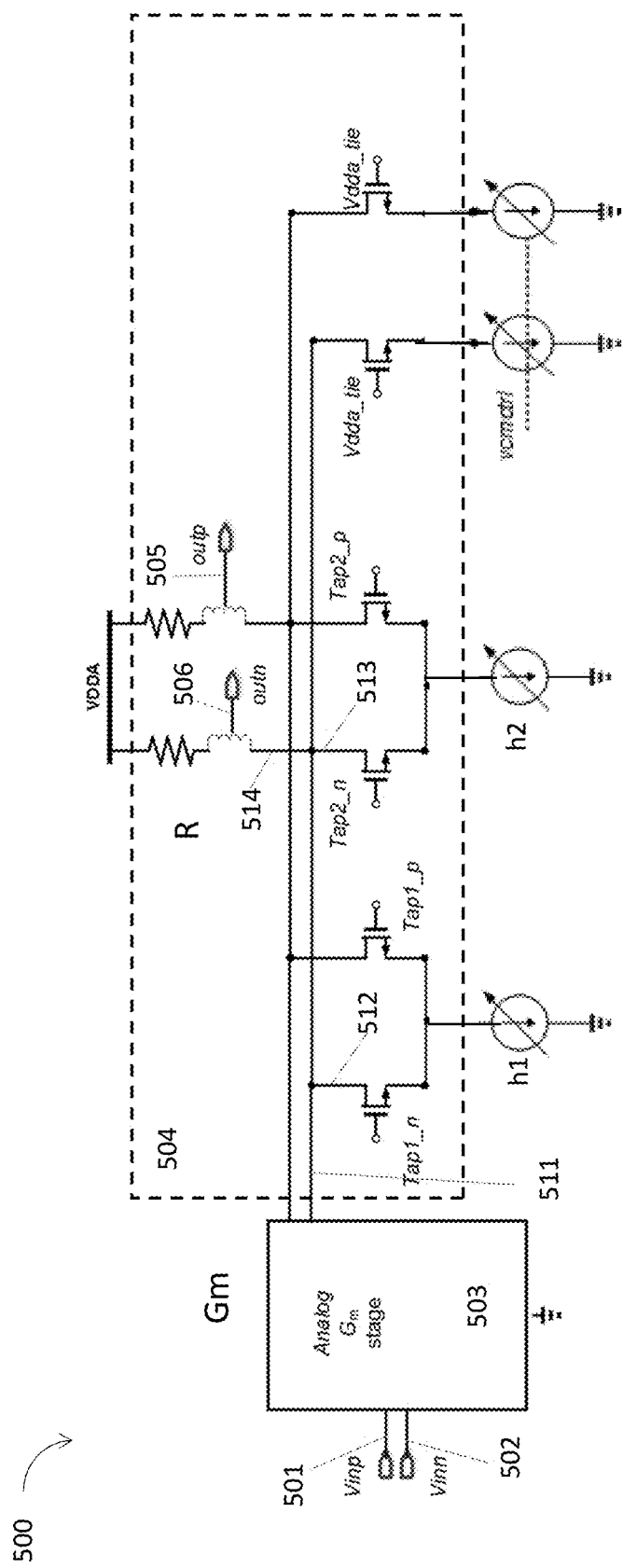
FIG. 5 schematically illustrates a block diagram of a first summer circuit used in a DFE, according to various embodiments.

FIG. 5 schematically illustrates a block diagram of a summer circuit 500 used in a DFE, according to various embodiments. In embodiments, the summer circuit 500 may be an example of the first summer circuit 211 for the DFE 210 as shown in Figure, or the first summer circuit 311 for the DFE 310 as shown in FIG. 3.

In embodiments, the summer circuit 500 includes a LTI circuit 503 and an adder 504, which is a current adder. The LTI circuit 503 converts an analog signal represented by two voltage signals, e.g., a voltage signal 501, and a voltage signal 502, to a current signal 511. A time delayed signal of the detected symbol is represented by two voltage signals. For example, a voltage signal Tap1_n and a voltage signal Tap1_p represent a first time delayed signal of the detected symbol; while a voltage signal Tap2_n and a voltage signal Tap2_p represent a second time delayed signal of the detected symbol. A weighted feedback tap h(1) of the time delayed signal of the detected symbol, represented by Tap1_n and a voltage signal Tap1_p, generates a current 512. A weighted feedback tap h(2) of the time delayed signal of the detected symbol, represented by Tap2_n and a voltage signal Tap2p, generates a current 513. A current 514 is a sum of the current 511, the current 512, and the current 513. An output voltage signal 506 and an output voltage signal 505 represent a first summand, which is a sum of the analog signal represented by the voltage signal 501 and the voltage signal 502, and the first set of weighted feedback taps of {h(1), h(2)} of the time delayed signals of the detected symbol.

Figure 6:
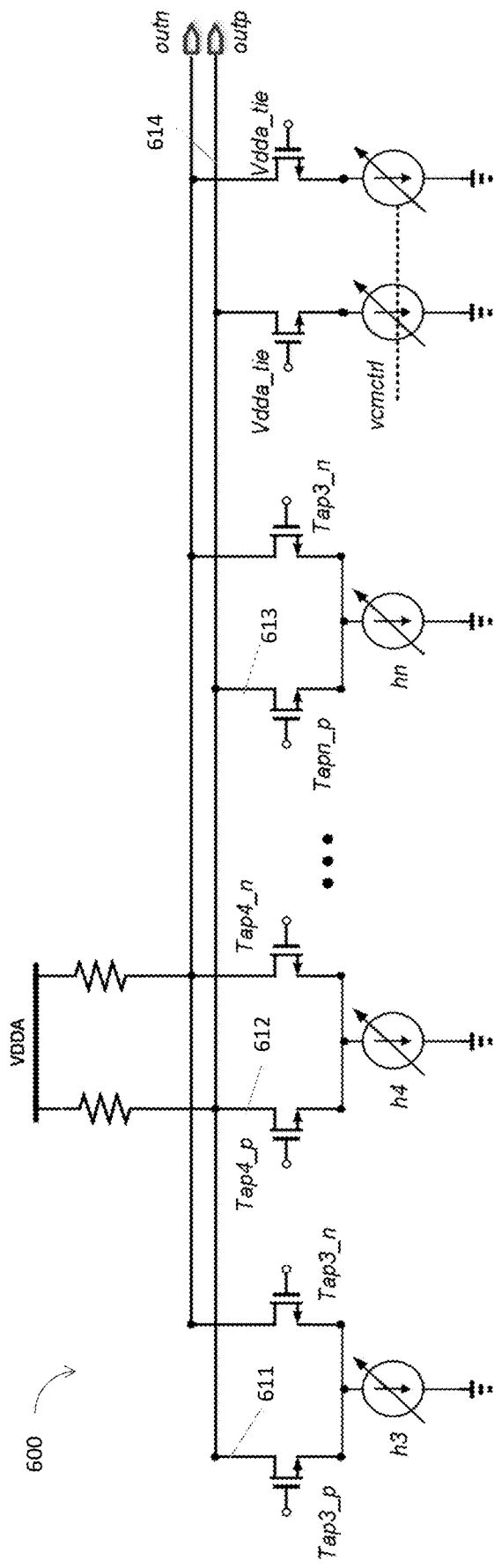
FIG. 6 schematically illustrates a block diagram of a second summer circuit used in a DFE, according to various embodiments.

FIG. 6 schematically illustrates a block diagram of another summer circuit 600 used in a DFE, according to various embodiments. In embodiments, the summer circuit 600 may be an example of the second summer circuit 212 for the DFE 210 as shown in Figure, or the second summer circuit 312 for the DFE 310 as shown in FIG. 3.

In embodiments, the summer circuit 600 performs functions of a current adder, to add together a set of weighted feedback taps {h(3), . . . h(n)} of the time delayed signals of the detected symbol to generate the second summand 614. For example, a voltage signal Tap3_$n$ and a voltage signal Tap3$p$ represent a third time delayed signal of the detected symbol; while a voltage signal Tap4_$n$ and a voltage signal Tap4$p$ represent a fourth time delayed signal of the detected symbol. A weighted feedback tap h(3) of the time delayed signal of the detected symbol, represented by Tap3_$n$ and a voltage signal Tap3_$p$, generates a current 611. A weighted feedback tap h(4) of the time delayed signal of the detected symbol, represented by Tap4_$n$ and a voltage signal Tap4_$p$, generates a current 612. A current 614 is a sum of the current 511, the current 512, and the rest of the current 613.

Figure 7:
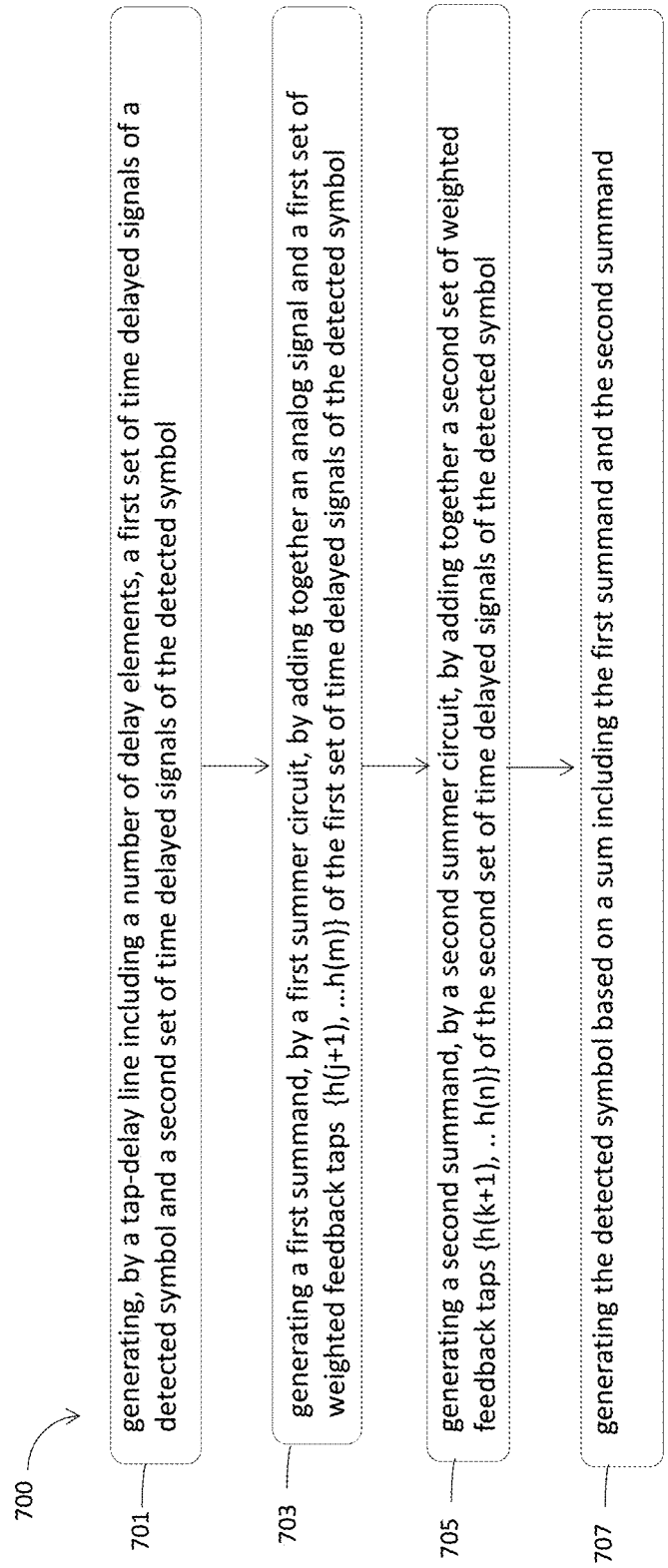
FIG. 7 schematically illustrates a flow diagram of a process for forming a DFE, according to various embodiments.

FIG. 7 schematically illustrates a flow diagram of a process 700 for decision feedback equalization (DFE), according to various embodiments.

At block 701, the process 700 may include generating, by a tap-delay line including a number of delay elements, a first set of time delayed signals of a detected symbol and a second set of time delayed signals of the detected symbol.

At block 703, the process 700 may include generating a first summand, by a first summer circuit, by adding together an analog signal and a first set of weighted feedback taps {h(j+1), . . . h(m)} of the first set of time delayed signals of the detected symbol.

At block 705, the process 700 may include generating a second summand, by a second summer circuit, by adding together a second set of weighted feedback taps {h(k+1), h(n)} of the second set of time delayed signals of the detected symbol.

At block 707, the process 700 may include generating the detected symbol based on a sum including the first summand and the second summand.

Figure 8:
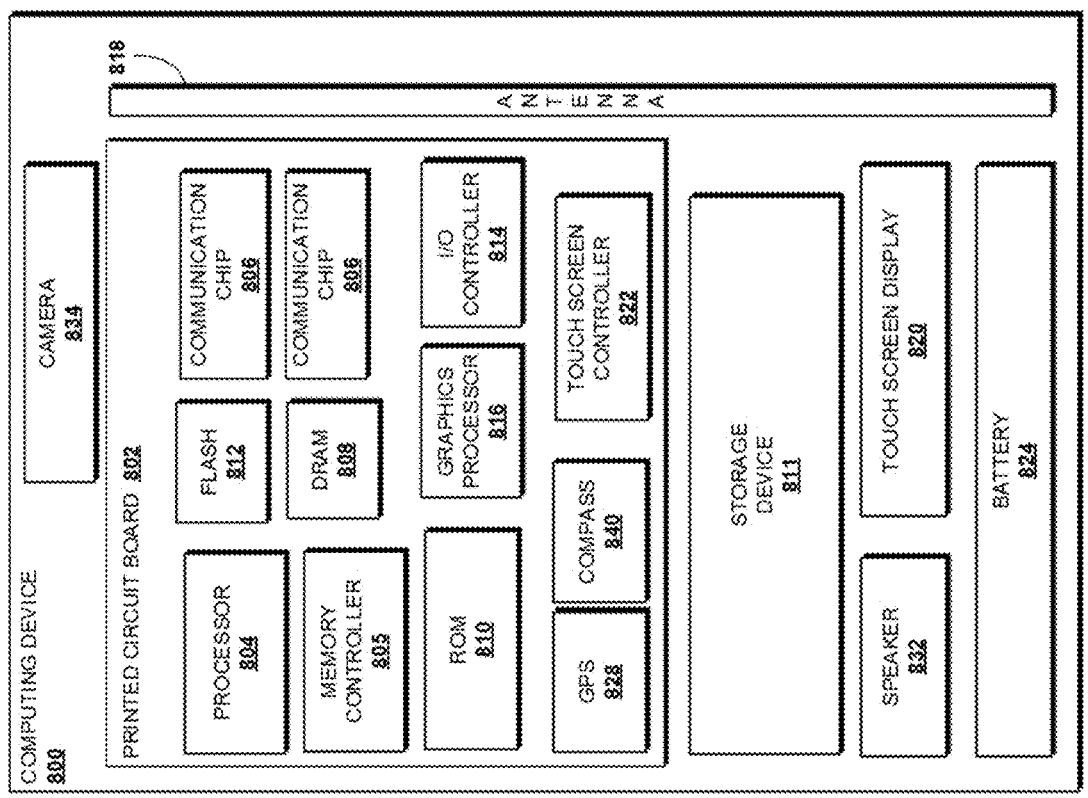
FIG. 8 illustrates an example system configured to employ the apparatuses and methods described herein, in accordance with various embodiments.

FIG. 8 illustrates an example computing device 800 that may employ the apparatuses and/or methods described herein (e.g., the receiver 112, the DFE 110, the DFE 210, the DFE 310, the decision circuit 400, the summer circuit 500, the summer circuit 600, as shown in FIGS. 1-6, and the process 700 shown in FIG. 7), in accordance with various embodiments. As shown, computing device 800 may include a number of components, such as one or more processor(s) 804 (one shown) and at least one communication chip 806. In various embodiments, the one or more processor(s) 804 each may include one or more processor cores. In various embodiments, the at least one communication chip 806 may be physically and electrically coupled to the one or more processor(s) 804. In further implementations, the communication chip 806 may be part of the one or more processor(s) 804. In various embodiments, computing device 800 may include printed circuit board (PCB) 802. For these embodiments, the one or more processor(s) 804 and communication chip 806 may be disposed thereon. In alternate embodiments, the various components may be coupled without the employment of PCB 802.

Depending on its applications, computing device 800 may include other components that may or may not be physically and electrically coupled to the PCB 802. These other components include, but are not limited to, memory controller 805, volatile memory (e.g., dynamic random access memory (DRAM) 808), non-volatile memory such as read only memory (ROM) 810, flash memory 812, storage device 811 (e.g., a hard-disk drive (HDD)), an I/O controller 814, a digital signal processor (not shown), a crypto processor (not shown), a graphics processor 816, one or more antenna 818, a display (not shown), a touch screen display 820, a touch screen controller 822, a battery 824, an audio codec (not shown), a video codec (not shown), a global positioning system (GPS) device 828, a compass 830, an accelerometer (not shown), a gyroscope (not shown), a speaker 832, a camera 834, and a mass storage device (such as hard disk drive, a solid state drive, compact disk (CD), digital versatile disk (DVD)) (not shown), and so forth. In various embodiments, the processor 804 may be integrated on the same die with other components to form a System on Chip (SoC).

In some embodiments, the one or more processor(s) 804, flash memory 812, and/or storage device 811 may include associated firmware (not shown) storing programming instructions configured to enable computing device 800, in response to execution of the programming instructions by one or more processor(s) 804, to practice all or selected aspects of the methods described herein. In various embodiments, these aspects may additionally or alternatively be implemented using hardware separate from the one or more processor(s) 804, flash memory 812, or storage device 811.

In various embodiments, one or more components of the computing device 800 may include the receiver 112, the DFE 110, the DFE 210, the DFE 310, the decision circuit 400, the summer circuit 500, the summer circuit 600, as shown in FIGS. 1-6, and/or otherwise employ techniques described herein. For example, the communication chip 806 may include the receiver 112, the DFE 110, the DFE 210, the DFE 310, the decision circuit 400, the summer circuit 500, the summer circuit 600, as shown in FIGS. 1-6, and/or otherwise employ techniques described herein.

The communication chips 806 may enable wired and/or wireless communications for the transfer of data to and from the computing device 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 806 may implement any of a number of wireless standards or protocols, including but not limited to IEEE 702.20, Long Term Evolution (LTE), LTE Advanced (LTE-A), 5G, General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computing device 800 may include a plurality of communication chips 806. For instance, a first communication chip 806 may be dedicated to shorter range wireless communications such as Wi-Fi and Bluetooth, and a second communication chip 806 may be dedicated to longer range wireless communications such as GPS, EDGE, GPRS, CDMA, WiMAX, LTE, Ev-DO, and others.

In various implementations, the computing device 800 may be a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an automobile, a medical device, an appliance, a portable music player, a digital video recorder, an electronic sensor, a smart home device, an internet of things (IoT) device, etc. In further implementations, the computing device 800 may be any other electronic device that processes data.

Examples

Example 1 may include a decision feedback equalizer (DFE), comprising: a first summer circuit to add together an analog signal and a first set of weighted feedback taps $\{h(j+1), \ldots h(m)\}$ of time delayed signals of a detected symbol to generate a first summand, wherein the detected symbol represents a digital value; a second summer circuit to add together a second set of weighted feedback taps $\{h(k+1), \ldots h(n)\}$ of time delayed signals of the detected symbol to generate a second summand; a decision circuit to receive at least the first summand and the second summand, and to generate the detected symbol based on a sum including the first summand and the second summand; and a tap-delay line including a number of delay elements to receive the detected symbol, and to generate the first set of the time delayed signals of the detected symbol and the second set of the time delayed signals of the detected symbol.

Example 2 may include the DFE of example 1 and/or some other examples herein, wherein the analog signal is represented by one or two input voltage signals or current signals.

Example 3 may include the DFE of example 1 and/or some other examples herein, wherein the analog signal is in a non-return-to-zero (NRZ) format, pulse amplitude modulation (PAM) 4 format, or PAM N format.

Example 4 may include the DFE of example 1 and/or some other examples herein, wherein the digital value is an one-bit binary digital value, a two-bit digital value, or a N-bit digital value.

Example 5 may include the DFE of example 1 and/or some other examples herein, wherein the first set of weighted feedback taps $\{h(j+1), \ldots h(m)\}$ or the second set of weighted feedback taps $\{h(k+1), \ldots h(n)\}$ include a set of consecutive weighted feedback-taps; and the first set of weighted feedback taps $\{h(j+1), \ldots h(m)\}$ and the second set of weighted feedback-taps $\{h(k+1), h(n)\}$ share at least one common tap.

Example 6 may include the DFE of example 1 and/or some other examples herein, wherein the first set of weighted feedback taps includes $\{h(1), h(2)\}$, and the second set of weighted feedback taps includes $\{h(3), \ldots h(n)\}$.

Example 7 may include the DFE of example 1 and/or some other examples herein, wherein the first set of weighted feedback taps of the time delayed signals of the detected symbol are generated based on the detected symbol time delayed by at most k time instances.

Example 8 may include the DFE of example 1 and/or some other examples herein, wherein second set of weighted feedback taps of the time delayed signals of the detected symbol are generated based on the detected symbol time delayed by at least (k+1) time instances.

Example 9 may include the DFE of example 1 and/or some other examples herein, wherein the first summer circuit includes at least a linear time-invariant (LTI) circuit and a voltage, current, or charge adder to add together a voltage, current, or charge of the analog signal and a voltage, current, or charge of the first set of weighted feedback taps of the time delayed signals of the detected symbol to generate the first summand.

Example 10 may include the DFE of example 9 and/or some other examples herein, wherein the LTI circuit includes a transconductance-resistance (GmR) circuit, and wherein the GmR circuit includes a transconductance, and an impedance, to couple the analog signal to the first summand.

Example 11 may include the DFE of example 1 and/or some other examples herein, wherein the first summer circuit includes a circuit to buffer the analog signal, a circuit to gain adjust the analog signal, or a circuit to apply frequency peaking of the analog signal.

Example 12 may include the DFE of example 1 and/or some other examples herein, wherein the decision circuit includes a voltage, current, or charge adder and a sampler, wherein the voltage, current, or charge adder is to add together voltages, currents, or charges representing the first summand and the second summand.

Example 13 may include the DFE of example 12 and/or some other examples herein, wherein the decision circuit is further to receive a reference voltage signal, and to generate the detected symbol based on the reference voltage signal and a sum of the first summand and the second summand.

Example 14 may include the DFE of example 1 and/or some other examples herein, wherein the decision circuit includes multiple voltage, current, or charge adders and multiple samplers to generate the detected symbol including multiple bits of the digital value.

Example 15 may include the DFE of example 14 and/or some other examples herein, wherein the DFE further includes a decoder to generate an output signal including multiple bits, based on the time delayed signals of the detected symbol.

Example 16 may include the DFE of example 1 and/or some other examples herein, wherein the DFE is to generate an output signal that is a time delayed signal of the detected symbol.

Example 17 may include the DFE of example 1 and/or some other examples herein, wherein a delay element of the number of delay elements includes a shift register.

Example 18 may include the DFE of example 1 and/or some other examples herein, wherein the second summer circuit includes a voltage, current, or charge adder to add together the second set of weighted feedback taps of the time delayed signals of the detected symbol to generate the second summand.

Example 19 may include an apparatus for decision feedback equalization (DFE), comprising: means for generating, by a tap-delay line including a number of delay elements, a first set of time delayed signals of a detected symbol and a second set of time delayed signals of the detected symbol; means for generating a first summand, by a first summer circuit, by adding together an analog signal and a first set of weighted feedback taps $\{h(j+1), \ldots h(m)\}$ of the first set of time delayed signals of the detected symbol; means for generating a second summand, by a second summer circuit, by adding together a second set of weighted feedback taps $\{h(k+1), h(n)\}$ of the second set of time delayed signals of the detected symbol; and means for generating the detected symbol based on a sum including the first summand and the second summand.

Example 20 may include the apparatus of example 19 and/or some other examples herein, wherein the first summer circuit includes at least a linear time-invariant (LTI) circuit and a voltage, current, or charge adder, and the generating the first summand includes adding together, by the voltage, current, or charge adder, the analog signal and the first set of weighted feedback taps {h(j+1), ... h(m)} of the first set of time delayed signals of the detected symbol.

Example 21 may include the apparatus of example 19 and/or some other examples herein, wherein the means for generating the detected symbol includes means for adding together, by a voltage, current, or charge adder, voltages, currents, or charges representing the first summand and the second summand.

Example 22 may include a receiver of a communication system, comprising: a decision feedback equalizer (DFE), wherein the DFE includes: a first summer circuit to add together an analog signal and a first set of weighted feedback taps {h(j+1), ... h(m)} of time delayed signals of a detected symbol to generate a first summand, wherein the detected symbol represents a digital value; a second summer circuit to add together a second set of weighted feedback taps {h(k+1), ... h(n)} of time delayed signals of the detected symbol to generate a second summand; a decision circuit to receive at least the first summand and the second summand, and to generate the detected symbol based on a sum including the first summand and the second summand; and a tap-delay line including a number of delay elements to receive the detected symbol, and to generate the first set of the time delayed signals of the detected symbol and the second set of the time delayed signals of the detected symbol.

Example 23 may include the receiver of example 22 and/or some other examples herein, further comprising: a serializer and a deserializer coupled to the DFE.

Example 24 may include the receiver of example 22 and/or some other examples herein, wherein the first summer circuit includes at least a linear time-invariant (LTI) circuit and a voltage, current, or charge adder to add together a voltage, current, or charge of the analog signal and a voltage, current, or charge of the first set of weighted feedback taps of the time delayed signals of the detected symbol to generate the first summand; wherein the decision circuit includes multiple voltage, current, or charge adders and multiple samplers to generate the detected symbol including multiple bits of the digital value; and wherein the second summer circuit includes a voltage, current, or charge adder to add together the second set of weighted feedback taps of the time delayed signals of the detected symbol to generate the second summand.

Example 25 may include the receiver of example 22 and/or some other examples herein, wherein the analog signal is represented by one or two input voltage signals or current signals, and the analog signal is in a non-return-to-zero (NRZ) format, pulse amplitude modulation (PAM) 4 format, or PAM N format.

These modifications may be made to the disclosure in light of the above detailed description. The terms used in the following claims should not be construed to limit the disclosure to the specific implementation disclosed in the specification and the claims. Rather, the scope of the disclosure is to be determined entirely by the following claims, which are to be construed in accordance with established doctrines of claim interpretation.

The invention claimed is:

1. A decision feedback equalizer (DFE), comprising:
a first summer circuit to add together an analog signal and a first set of weighted feedback taps {h(j+1), ... h(m)} of time delayed signals of a detected symbol to generate a first summand, wherein the detected symbol represents a digital value;
a second summer circuit to add together a second set of weighted feedback taps {h(k+1), ... h(n)} of time delayed signals of the detected symbol to generate a second summand;
a decision circuit to receive at least the first summand and the second summand, and to generate the detected symbol,
wherein the decision circuit includes a voltage, current, or charge adder and a sampler, wherein the voltage, current, or charge adder is to add together voltages, currents, or charges representing the first summand and the second summand,
wherein the decision circuit is further to receive a reference voltage signal, and to generate the detected symbol based on the reference voltage signal and a sum of the first summand and the second summand, and
wherein the decision circuit is to receive the analog signal via the first summer circuit but not via the second summer circuit; and
a tap-delay line including a number of delay elements to receive the detected symbol, and to generate a first set of the time delayed signals of the detected symbol and a second set of the time delayed signals of the detected symbol.

2. The DFE of claim 1, wherein the analog signal is represented by one or two input voltage signals or current signals.

3. The DFE of claim 1, wherein the analog signal is in a non-return-to-zero (NRZ) format, pulse amplitude modulation (PAM) 4 format, or PAM N format.

4. The DFE of claim 1, wherein the digital value is an one-bit binary digital value, a two-bit digital value, or a N-bit digital value.

5. The DFE of claim 1, wherein the first set of weighted feedback taps {h(j+1), ... h(m)} or the second set of weighted feedback taps {h(k+1), ... h(n)} include a set of consecutive weighted feedback-taps; and the first set of weighted feedback taps {h(j+1), ... h(m)} and the second set of weighted feedback-taps {h(k+1), ... h(n)} share at least one common tap.

6. The DFE of claim 1, wherein the first set of weighted feedback taps includes {h(1), h(2)}, and the second set of weighted feedback taps includes {h(3), ... h(n)}.

7. The DFE of claim 1, wherein the first set of weighted feedback taps of the time delayed signals of the detected symbol are generated based on a detected symbol time delayed by at most k time instances.

8. The DFE of claim 1, wherein the second set of weighted feedback taps of the time delayed signals of the detected symbol are generated based on a detected symbol time delayed by at least (k+1) time instances.

9. The DFE of claim 1, wherein the first summer circuit includes at least a linear time-invariant (LTI) circuit and a voltage, current, or charge adder to add together a voltage, current, or charge of the analog signal and a voltage, current, or charge of the first set of weighted feedback taps of the time delayed signals of the detected symbol to generate the first summand.

10. The DFE of claim 9, wherein the LTI circuit includes a transconductance-resistance (GmR) circuit, and wherein the GmR circuit includes a transconductance, and an impedance, to couple the analog signal to the first summand.

11. The DFE of claim 1, wherein the first summer circuit includes a circuit to buffer the analog signal, a circuit to gain adjust the analog signal, or a circuit to apply frequency peaking of the analog signal.

12. The DFE of claim 1, wherein the DFE further includes a decoder to generate an output signal including multiple bits, based on the time delayed signals of the detected symbol.

13. The DFE of claim 1, wherein the DFE is to generate an output signal that is a time delayed signal of the detected symbol.

14. The DFE of claim 1, wherein a delay element of the number of delay elements includes a shift register.

15. The DFE of claim 1, wherein the second summer circuit includes a voltage, current, or charge adder to add together the second set of weighted feedback taps of the time delayed signals of the detected symbol to generate the second summand.

16. A receiver of a communication system, comprising:
a decision feedback equalizer (DFE), wherein the DFE includes:
a first summer circuit to add together an analog signal and a first set of weighted feedback taps $\{h(j+1), \ldots h(m)\}$ of time delayed signals of a detected symbol to generate a first summand, wherein the detected symbol represents a digital value;
a second summer circuit to add together a second set of weighted feedback taps $\{h(k+1), \ldots h(n)\}$ of time delayed signals of the detected symbol to generate a second summand;
a decision circuit to receive at least the first summand and the second summand, and to generate the detected symbol based on a sum including the first summand and the second summand, wherein the decision circuit is to receive the analog signal via the first summer circuit but not via the second summer circuit; and
a tap-delay line including a number of delay elements to receive the detected symbol, and to generate a first set of the time delayed signals of the detected symbol and a second set of the time delayed signals of the detected symbol;
wherein the first summer circuit includes at least a linear time-invariant (LTI) circuit and a voltage, current, or charge adder to add together a voltage, current, or charge of the analog signal and a voltage, current, or charge of the first set of weighted feedback taps of the time delayed signals of the detected symbol to generate the first summand;
wherein the decision circuit includes multiple voltage, current, or charge adders and multiple samplers to generate the detected symbol including multiple bits of the digital value; and
wherein the second summer circuit includes a voltage, current, or charge adder to add together the second set of weighted feedback taps of the time delayed signals of the detected symbol to generate the second summand.

17. The receiver of the claim 16, further comprising:
a serializer and a deserializer coupled to the DFE.

18. The receiver of the claim 16, wherein the analog signal is represented by one or two input voltage signals or current signals, and the analog signal is in a non-return-to-zero (NRZ) format, pulse amplitude modulation (PAM) 4 format, or PAM N format.

19. A decision feedback equalizer (DFE), comprising:
a first summer circuit to add together an analog signal and a first set of weighted feedback taps $\{h(j+1), \ldots h(m)\}$ of time delayed signals of a detected symbol to generate a first summand, wherein the detected symbol represents a digital value;
a second summer circuit to add together a second set of weighted feedback taps $\{h(k+1), \ldots h(n)\}$ of time delayed signals of the detected symbol to generate a second summand;
a decision circuit to receive at least the first summand and the second summand, and to generate the detected symbol based on a sum including the first summand and the second summand, wherein the decision circuit is to receive the analog signal via the first summer circuit but not via the second summer circuit, and the decision circuit includes multiple voltage, current, or charge adders and multiple samplers to generate the detected symbol including multiple bits of the digital value; and
a tap-delay line including a number of delay elements to receive the detected symbol, and to generate a first set of the time delayed signals of the detected symbol and a second set of the time delayed signals of the detected symbol.

20. The DFE of claim 19, wherein the DFE further includes a decoder to generate an output signal including multiple bits, based on the time delayed signals of the detected symbol.

21. The DFE of claim 19, wherein the decision circuit includes a voltage, current, or charge adder and a sampler, wherein the voltage, current, or charge adder is to add together voltages, currents, or charges representing the first summand and the second summand.

* * * * *